Oct. 7, 1924.
K. CADWALADER
1,510,456
TRUCK
Filed July 17, 1922
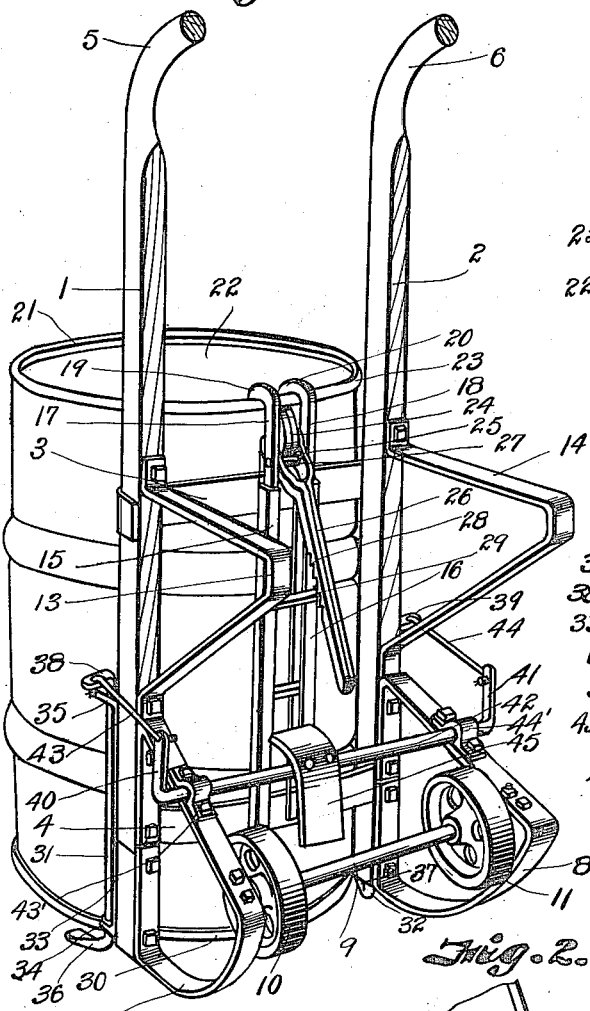
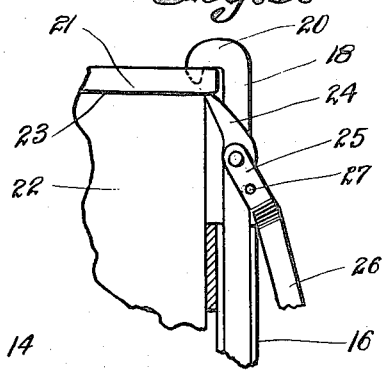
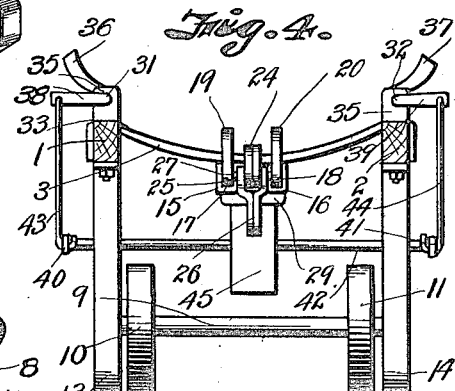
INVENTOR
Kinsey Cadwalader.
BY
ATTORNEY Patented Oct. 7, 1924.

1,510,456

UNITED STATES PATENT OFFICE.

KINSEY CADWALADER, OF KANSAS CITY, KANSAS.

TRUCK.

Application filed July 17, 1922. Serial No. 575,527.

*To all whom it may concern:*

Be it known that I, KINSEY CADWALADER, a citizen of the United States, residing at Kansas City, in the county of Wyandotte and State of Kansas, have invented certain new and useful Improvements in Trucks; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to trucks and particularly to a barrel truck in which mechanism is included for securing the barrel to the truck so that the barrel can be tilted on its edge by tilting the truck and whereby the barrel will be secured against accidental displacement from the truck until such time as it is desired to release it.

In this connection I wish to state that I use the word "barrel" as comprehending any receptacle of like nature whether of wood, metal or other suitable material and I, therefore, do not wish to be limited to the use of the truck in connection with receptacles specifically referred to as barrels in contra-distinction to cans, or similar receptacles of like nature.

The novel features of the invention will be clearly apparent by reference to the following description in connection with the accompanying drawings, in which—

Fig. 1 is a perspective view of a truck constructed in accordance with my invention showing a barrel ready to be tilted onto the truck.

Fig. 2 is a side view of the truck showing a fragment of a barrel supported by the truck.

Fig. 3 is a detail view of the barrel attaching means, and

Fig. 4 is a sectional view on the line 4—4 of Fig. 2.

The truck is shown as comprising a barrel supporting frame consisting of two side bars 1 and 2 connected by cross bars 3 and 4. The side bars 1 and 2 have the usual handles 5 and 6 at their front ends and at their rear ends are rockers 7 and 8. The rockers are shown as comprising strips bent to form curved rocking surfaces, the ends of the strips being fastened to the under faces of the sides bars 1 and 2. The rockers also constitute brackets for the shaft 9 in which the truck wheels or rollers 10 and 11 are secured. The shaft 9 can be secured to the combined rocker and bracket members by U-bolts, which are shown in elevation and designated 12 in Fig. 2.

The side bars 1 and 2 carry legs or rests 13 and 14 so that when the truck is in horizontal position the wheels and the rests will support the side bars 1 and 2 in substantially parallel relation with the floor or other support.

Carried by the cross bars 3 and 4 are two guide bars 15 and 16, in which are slidably mounted barrel-engaging bars 17 and 18, having hooked ends 19 and 20 which are adapted to engage over the chime 21 of the barrel or receptacle 22.

The barrel or receptacle is shown as provided with a bead or collar 23 and the under edge thereof may be engaged by a dog or pawl 24, carried by the bifurcated portion 25 and the lever 26. The lever 26 is pivoted between the bars 17 and 18 by a pivot 27 and its lower edge may be notched as at 28. The notches are adapted to be engaged by a detent bar 29 carried by the bars 17 and 18 to hold the lever 26 in adjusted position. However, the serrations and the bar 29 may be omitted if desired, because ordinarily, the dog 24 will remain in place after it has been applied as shown in Fig. 3.

When it is desired to lift a barrel, the truck is moved into juxtaposition to the barrel, as shown in Fig. 1. Then the bars 17 and 18 are raised to the necessary height to allow the hooks 19 and 20 to fit over the chime; the dog 24 is caused to engage the under edge of the collar 23, there being enough play between the end of the dog and the hook to permit the dog to pass under the collar 23. The dog will prevent the barrel from slipping out of engagement with the hook when the truck is tilted and if it is desired to prevent longitudinal movement of the bars 17 and 18, the lever 26 will be caused to engage with the bar 29 so that the weight of the barrel may be supported in a measure by the bar 29 when the truck is tilted.

The operator now tilts the truck on the rockers 7 and 8; the barrel, resting on the floor, will tilt over on its edge portion 30 until the truck is in practically a horizontal position. Therefore, it will be seen that the barrel need not be lifted from the floor but can be swung over on the truck simply by tilting the truck toward the operator. There will be no liability of slipping because the wheels 10 and 11 will not come into contact with the floor until the truck is practically in a horizontal position.

If it is desired to augment the securing means consisting of the hooks 19 and 20 and the dog 24, additional mechanism can be employed. In this connection I have shown two rods 31 and 32, mounted in bearings on the bars 1 and 2. One bearing 33 is shown in Fig. 2. The bearing consists of an elongated plate with upstanding ends 34 and 35 in which the rods are rotatably and slidably mounted.

There is a bearing on each side bar 1 and 2 for each rod 31 and 32. The lower ends of the rods 31 and 32 have right angularly projecting fingers 36 and 37 respectively to swing under the lower end of the barrel. The upper ends of the rods 31 and 32 have right angularly projecting crank arms 38 and 39, which are disposed at angles of about 90 degrees with respect to the fingers 36 and 37. These crank arms 38 and 39 are connected to the crank arms 40 and 41 on a rock shaft 42 by links 43 and 44 so that when the rock shaft 42 rocks in one direction, the fingers 36 and 37 will swing under the barrel and when it is rocked in an opposite direction, they will swing out of engagement with the barrel. The rock shaft 42 is mounted in bearings 43' and 44' on the rockers 7 and 8, as will be clearly seen by reference to Figs. 1 and 2.

Between the rockers rigid with the rock shaft 42 is a pedal or foot-actuated plate 45, which can be engaged by the foot of the operator to swing the rock shaft 42 in either direction. It will therefore be seen that if the auxiliary mechanism is used, it will be brought into play when the barrel is tilted. For example, when the truck starts to rock over on the rockers 7 and 8 to tilt the barrel, the operator can press against the pedal or foot-actuated member 45 so as to swing the crank shafts 40 and 41 away from him. Then the fingers 36 and 37 will swing under the barrel. The hooks and side bars 17 and 18 may be permitted to slide slightly in their guides 15 and 16 so that the barrel will settle upon the fingers 36 and 37, as it is being lifted from the floor, that is, after it has been tilted on its edge 30 to nearly a horizontal position, the pressure of the barrel against the fingers 36 and 37 will not permit any disengagement thereof and will prevent the barrel from sliding longitudinally of the truck even if tilted to practically an inverted position after it is on the truck.

When the truck has carried the barrel to its destination, the truck will be up-ended; that is, it will be thrown back to the position substantially shown in Fig. 1, where the barrel will rest upon the floor again and just prior to throwing the barrel to a vertical position, however, the operator will press on the member 45 again to cause the rock shaft 42 to rotate so as to throw the crank arms 40 and 41 toward him and thereby throw the finger 36 out of engagement with the bottom of the barrel. The dog 24 may then be released from the under side of the collar on the barrel 22, whereupon the barrel will rest upon the floor. The hooks 19 and 20 can be disengaged from the chime of the barrel and the truck moved away therefrom to receive another barrel.

It will be apparent that the device is quite simple in operation, that its use will require a minimum of energy on the part of the operator in handling barrels, casks and the like, and that the barrels can be handled with facility and dispatch.

I do not wish to be limited to the exact details of construction shown but reserve the right to make such changes in form, proportion and minor details of construction as properly come within the scope of the appended claims.

What I claim and desire to secure by Letters Patent is:

1. A truck comprising a frame, wheels supporting said frame and barrel chime-engaging means carried by the frame, said means comprising a slidable member having hooked ends for engaging the chime, a chime-engaging dog co-operating with the hooked ends and a lever for actuating the dog.

2. A truck comprising a frame, wheels supporting said frame and barrel chime-engaging means carried by the frame, said means comprising a slidable member having hooked ends for engaging the chime, a chime-engaging dog co-operating with the hooked ends and a lever for actuating the dog, said lever having notches and means in the frame for engaging the notches.

In testimony whereof I affix my signature.

KINSEY CADWALADER.